April 29, 1941.  S. C. FORRESTER  2,239,888
VEHICLE COVER SUPPORTING STRUCTURE
Filed Sept. 24, 1938  2 Sheets-Sheet 1
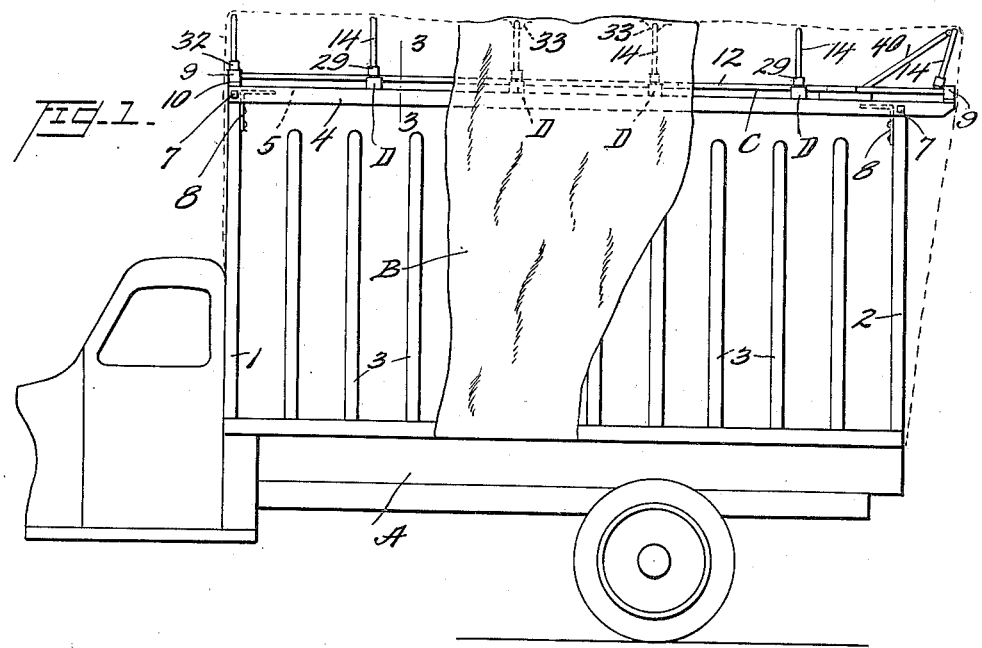
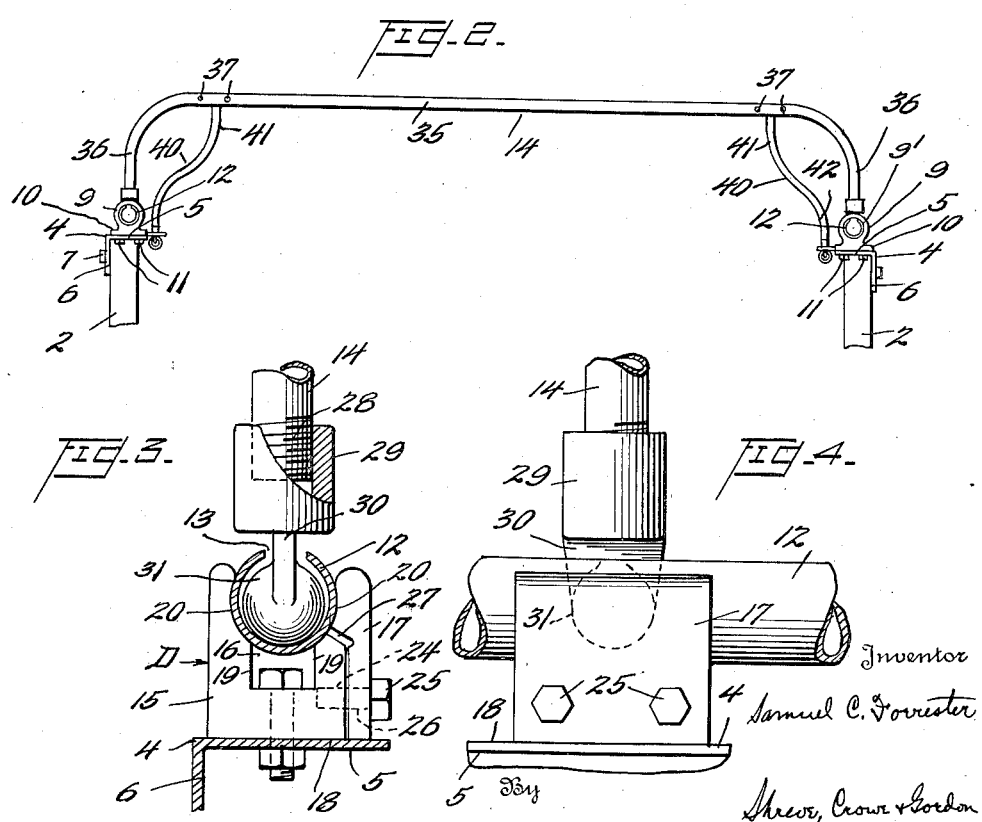

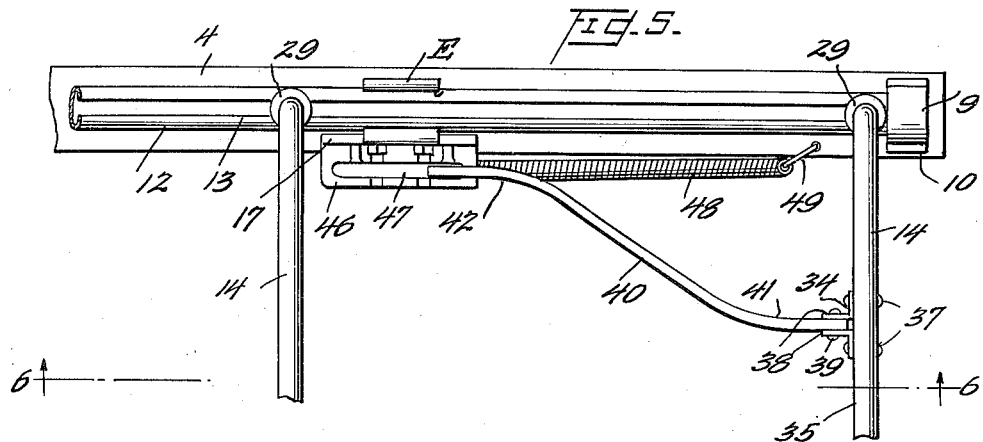
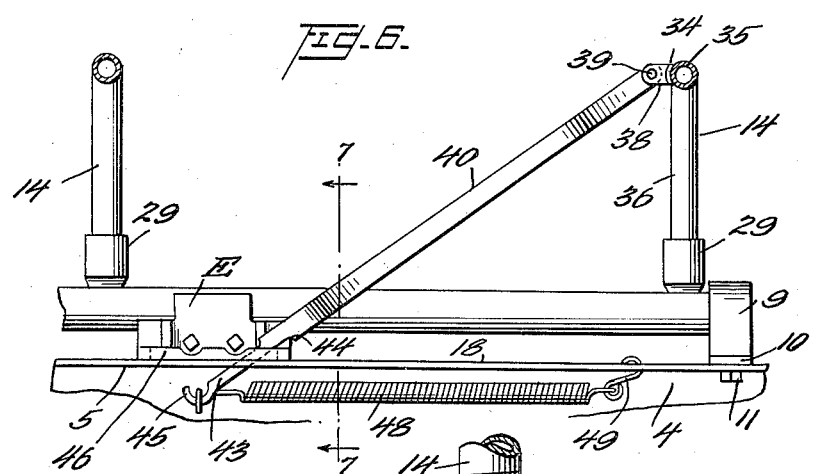
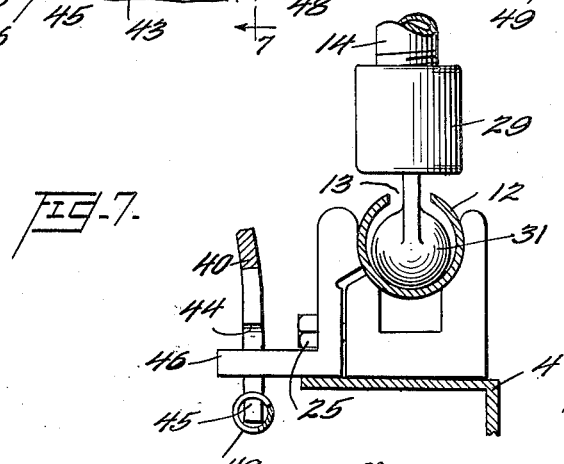

Patented Apr. 29, 1941

2,239,888

UNITED STATES PATENT OFFICE 2,239,888

VEHICLE COVER SUPPORTING STRUCTURE

Samuel C. Forrester, Atlanta, Ga., assignor to Fulton Bag and Cotton Mills, Atlanta, Ga.

Application September 24, 1938, Serial No. 231,599

8 Claims. (Cl. 296—105)

Generically this invention relates to vehicle body covers but it is more especially directed to an improved collapsible cover supporting frame for truck bodies wherein the cover supporting elements may be easily extended or collapsed by a single operator, and constitutes an improvement on Patent No. 2,068,041, January 18, 1937.

One of the principal objects of this invention is the provision of means for mounting the collapsible bows and yieldable bow brace adapted to compensate for shrinkage and stretching of the cover to maintain the same taut irrespective of weather conditions.

Another important object of this invention is the provision of a collapsible cover supporting frame and bow structure adaptable to various truck body types including the open body, wherein the sides comprise a plurality of detachable standards.

Another important object of this invention is the provision of cover frame supporting side bars, improved means carried by said bars adaptable to support thereon track members, and improved bow terminals adapted for slidable engagement in said tracks.

A further important object of this invention is the provision of an improved rear bow bracing structure for compensatingly maintaining the cover taut under varying weather conditions, especially designed to eliminate protruding parts exterior of the body and without occupying loading space interior thereof, said bows and brace structure being easily manipulated by a single operator as desired.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a fragmentary side elevation of a truck and cover with the cover supporting bow structure in operative position.

Fig. 2 is an end view of the rear end supporting bow structure.

Fig. 3 is a view taken on the line 3—3 of Fig. 1.

Fig. 4 is an elevation at right angles to Fig. 3.

Fig. 5 is a fragmentary plan view of the supporting frame and bow structure showing the rear bow bracing mechanism.

Fig. 6 is a section of the line 6—6 of Fig. 5.

Fig. 7 is a section on the line 7—7 of Fig. 6.

The collapsible cover supporting frame structures with which I am familiar have proven deficient in many respects, such as not being adaptable to various types of vehicle or truck bodies, requiring cumbersome and unsightly supporting elements for the raceways, the structure of the bow holders in many instances tending to prevent uniform movement of the bows over said tracks, and unsatisfactory rear bow retaining means, in some instances projecting beyond the normal confines of the body; and it was to overcome such deficiencies and to provide an angle type of side bar, improved track holder structures easily mounted on and secured to the side bars adapted to adjustably engage said track members to support the track vertically above said side bars, and rear bow tensioning and bracing means hingedly connected to said bow and movably and yieldably supported by said track spaced therefrom, so as to yieldably and compensatingly maintain the cover taut irrespective of weather conditions and at the same time permitting easy extension or collapse of said bows and cover, that I designed the cover supporting structure forming the subject matter of this invention.

In the illustrated embodiment characterizing this invention there is shown a truck body A canvas or other flexible cover B and collapsible cover supporting frame structure C.

While I do not desire to confine myself to any particular type of truck body since the structure C is applicable to various types, in the present instance, the truck body A is of the open type having at the opposite front corners standards 1, at the rear corners standards 2, and at each side of the truck intermediate standards 1 and 2, the sides of the truck body being formed with a plurality of detachable slats or standards 3 as will be well understood.

Mounted on the upper ends of corner posts 1 and 2 at each side of the body is an angle supporting frame member or side bar 4 with one surface 5 resting on the tops of the end posts and the other surface 6 engaging the outer edges of said posts to which said bars are firmly secured by bolts 7 or other suitable fastening elements, and if desired, and in order to effect a more rigid connection, said posts and members 4 may be connected by angle braces 8 suitably secured as desired. Bars 4 if desired may be constructed of wood or the like.

The rear ends of members 4 in the present instance, project rearwardly beyond posts 2 so that cover B may sufficiently overhang to protect the contents of the truck. Mounted at each end of the respective frame members 4 is a track support 9 having a widened base portion 10 formed with threaded openings adapted to receive the threaded bolts 11, extending through member 5 firmly attaching said support and member. Members 9 are formed with openings 9' adapted to receive the ends of the tubular raceways 12, the latter being formed in their upper sides with cutout portions or slots 13 extending throughout their length for a purpose directly more fully appearing.

A series of supporting blocks or structures D are mounted on each of the side bars or frame members 4. While the position of these may be varied, in the present instance, they are located at the points of the respective arcuate or curved bows 14 adapted to support cover B as shown in Fig. 1. Each of these blocks comprises a substantially L-shaped section 15 having a suitable cutout portion 16 and a complemental section 17 and adapted to seat on surface 18 of member 5. Adjacent their upper ends and extending to walls 19 of cutout portions 16, said members are hollowed out to form seats 20 in which is adapted to seat a respective track member 12.

Member 15 is formed with a threaded countersunk opening 24 adapted to receive stud bolt 25 extending through opening 26 and adapted to effect binding engagement of member 17 with block 15 and clamping engagement with member 12 to maintain the latter against longitudinal or rotary movement. A space 27 is provided intermediate members 15 and 17 so that gripping or clamping engagement with member 12 may be effected irrespective of slight variations in size, etc.

The respective free ends of the movable curved bows 14 are threaded as at 28 adapted to engage in a complementally threaded holder 29 formed with a depending narrowed or flattened portion 30 terminating in a ball or rounded portion 31, said ball portions being adapted to engage in the respective track members 12, said holders constituting terminals for the bows and adapted for slidable engagement with said tracks, as will directly more fully appear.

It will be observed that the front bow 14 is adapted to be stationary, the end 28 of which is threadedly engaged in socket or bow holder portion 32, similar to holder section 29, and cast integral with support 9, constituting the front track support, and which is otherwise identical with rear support 9.

At proper spaced intervals, as shown in Fig. 1, the flexible cover B may be formed with straps or strips 33 sewed or otherwise suitably secured to the under surface, and through which the bows 14 may be threaded. In order to maintain the cover B taut and the bows in proper supporting position, it is necessary to have a brace structure in connection with the rear bow 14 and which, in the present instance, comprises an anchor bracket 34 mounted on horizontal portion 35 and spaced inwardly from its vertical portions 36 and is secured by bolts or rivets 37. Said member 34 is formed with spaced ears 38 between which is pivotally mounted on pin 39 one end of brace rod 40, said rod extending outwardly at right angles from said bow 14 to a point 41 and then downwardly and inwardly to 42 and outwardly in spaced parallelism with member 4 terminating in the reduced end portion 43 formed with shoulders 44 and terminating in hook 45. Securely clamped to track 12 at a point adjacent the end of brace rod 40 and adapted to seat on member 4 is the brace anchor or rod holder structure E, similar to structure D, except that member 17 at its lower end is formed with an elongated laterally extending plate element 46, said structure 17 being secured by bolts 25. Plate 46 is slotted as at 47 through which is adapted to extend end 43 of brace arm or rod 40 and in order to effect tensioning of said arm and its bow, a spring 48 has one end suitably secured to structure 5 of said member 4 by hook link 49 or in any suitable manner, the other end of said spring terminating in the eye portion 50 engageable over hook 45 as clearly shown in Fig. 6. It will be noted that the brace holders E are adjustable with respect to the tracks 12 in accordance with the shrinkage and stretching range of a particular top or to compensate for wear and tear of said top to insure proper operation of the rear bow tensioning structure.

The operation of my improved collapsible vehicle cover supporting frame structure would seem to be clear from the above description, yet it might be well to further state that when not in use or to facilitate loading and unloading the bows 14 carrying cover B may be slidably moved along the tracks 12 and secured in folded or collapsed position to the front and stationary bow 14 by a strap and buckle or any well known securing means. When it is desired to return the cover to extended or operative position a single operator may easily effect the same by sliding the rear bow 14 attached to the cover to its original position adjacent the rear end of the body and tracks 12, and at the same time, moving the intermediate bows to their respective positions as shown in Fig. 1, and before moving the rear bow to the limit of its position in extending direction, insert the free ends of brace member 40 through slots 47 and engage the ends of springs 48 over the hooks 45, then simply move the rear bow 14 to cover tightening position and it will maintain the cover taut through the instrumentality of braces 40 coacting with anchor structures E and tensioning springs 48, said springs 48 yieldably permitting sufficient movement of rear bow 14 to compensate for shrinkage and stretching of cover B as the cover becomes wet or dry by reason of weather conditions, the movement of said bow to collapse the structure, it is only necessary to disconnect the springs 48 from hooks 45 and as rear bow 14 is moved forwardly ends 43 of braces 40 will be disengaged from slots 47, as in the first instance.

From the above it will be apparent that I have provided a cover supporting frame structure including a rear bow yieldable brace structure positioned within the frame structure C and operating in line with the collapsible and extending movement of the frame and cover structure, thereby eliminating unsightly and cumbersome brace structures extending rearwardly beyond the rear bow which have proven unsatisfactory by reason of being in the way when backing the vehicle to unloading positions and the like, yet one easily manipulated to operative or collapsed positions without taking up space within the body inclosure, said frame structure embodying normally rigid and adjustable supporting structures for the tracks, permitting expeditious removal of the track and bow means and ready assembly thereof when desired, said cover supporting frame assembly being simple in construction, easy to manipulate, comprising few parts, manufacturable at a reasonable cost, and efficient for the purposes intended.

Although in practice it has been found that the form of the invention illustrated in the accompanying drawings and referred to in the above description as the preferred embodiment is the most efficient and practical; yet realizing the conditions concurrent with the adoption of the invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A collapsible vehicle cover supporting structure including quick detachable parallel members and a supporting frame structure therefor, a series of bows bridging said members, co-acting means between the free ends of the bows and the parallel members to permit slidable movement lengthwise thereof, a cover supported by and connected to said bows, means for stretching and holding the cover taut over said bows, said means including brace members connected to the upper stretch of one of said bows, anchor elements having clamping sections connected to the frame and adjustably connected to and adapted to support said parallel members, certain of said anchor members clampingly carried by and adjustable longitudinally of said parallel members, stop means carried by said brace members at points adjacent their free ends and engageable with said anchor elements carried by the parallel members to maintain said bow in cover stretching position, and yieldable means co-acting with the free ends of said brace members to hold said stop means in engaged position with respect to said last mentioned anchor elements to maintain said cover taut irrespective of the shrinking and stretching incident to weather conditions.

2. A collapsible vehicle cover supporting structure including quick detachable parallel members, a supporting frame structure therefor, a series of bows bridging said members, co-acting means between the free ends of the bows and the parallel members to permit slidable movement lengthwise thereof, a cover supported by and connected to said bows, means for stretching and holding the cover taut over said bows, said means including brace members connected to the upper stretch of one of said bows, anchor clamp elements carried by said parallel members and adjustable with respect thereto, certain of said elements having lateral extensions carried by and longitudinally adjustable with respect to said parallel members, stop means carried by said brace members adjacent their free extremities, said stop means being engageable with and fulcrumed on the extensions of said anchor elements, and yieldable means co-acting with the free ends of said brace members and frame, whereby to maintain said bow in cover stretching position while permitting a limited movement thereof to maintain said cover taut irrespective of the shrinking and stretching incident to weather conditions.

3. A collapsible vehicle cover supporting assembly including parallel track members, a series of bows bridging said members, and co-acting means between the free ends of the bows and said parallel members to permit slidable movement of the bows lengthwise of said parallel members, a cover supported by and connected to said bows, a supporting frame for said assembly, and means to effect a quick detachable connection between said assembly and said frame, said means including a plurality of block elements carried by the frame for supporting said track members, each of said elements embodying complemental clamp members interiorly formed to provide a seat conforming in contour to the surface of the track members.

4. A collapsible vehicle cover supporting assembly including parallel members, a series of bows bridging said members, and co-acting means between the free ends of the bows and said parallel members to permit slidable movement of the bows lengthwise of said parallel members, a cover supported by and connected to said bows, a supporting frame for said assembly, and means to effect a quick detachable connection between said assembly and said frame, said means including a plurality of seating members anchored to the frame, each member being composed of complemental readily adjustable clamping sections normally clamping said parallel members but adjustable to effect their release whereby said assembly may be quickly removed from said frame as a unit.

5. A collapsible vehicle cover supporting assembly including parallel track members, a series of bows bridging said members, and co-acting means between the free ends of the bows and said parallel members to permit slidable movement of the bows lengthwise of said parallel members, a cover supported by and connected to said bows, a supporting frame for said assembly, means to effect a quick detachable connection between said assembly and said frame, said means including a plurality of elements anchored to the frame, each composed of complemental clamping sections relatively adjustable for engaging said track members, means for stretching and holding the cover taut over said bows, said means including brace members connected to the upper stretch of one of said bows, a pair of tension blocks suspended from said parallel members and adjustable with respect thereto, means carried by said brace members adjacent their free extremities, said means being engageable with and fulcrumed on said tensioning blocks, and yieldable means anchored to the frame and co-acting with the free ends of said brace members, whereby to maintain said bow in cover stretching position while permitting a limited movement thereof to maintain said cover taut irrespective of shrinking and stretching incident to weather conditions.

6. A collapsible vehicle cover supporting assembly including parallel track members, a series of bows bridging said members, and co-acting means between the free ends of the bows and said parallel members to permit slidable movement of the bows lengthwise of said parallel members, a cover supported by and connected to said bows, a supporting frame for said assembly, means to effect a quick detachable connection between said assembly and said frame, said means including a plurality of track engaging and anchoring members, each member being composed of a pair of complemental sections, one of which is fixed to the vehicle frame, the other adjustable relative to the fixed section to engage and clamp the track member between said sections, means for stretching and holding the cover taut over said bows, said means including brace members connected to the upper stretch of one of said bows, anchor elements carried by said parallel members and adjustable with respect thereto, means carried by said brace members adjacent their free extremities, said means being engageable with and fulcrumed on said anchor elements, and yieldable means anchored to the frame and co-acting with the free ends of said brace members, whereby to maintain said bow in cover stretching position while permitting a limited movement thereof to maintain said cover taut irrespective of shrinking and stretching incident to weather conditions.

7. A collapsible vehicle cover supporting structure including quick detachable parallel members, a supporting frame structure therefor, a series of bows bridging said members, co-acting means between the free ends of the bows and the parallel members to permit slidable movement with respect thereto, a cover supported by and connected to said bows, a series of supporting blocks mounted on said frame, said blocks comprising complemental sections, one of said sections being hollowed out to form a track supporting seat, the other section being formed with a complemental track engaging seat and adjustable with respect to said first mentioned section, means for adjusting said adjustable section to bind said track against movement with respect to its seat and to permit its ready removal therefrom, similarly constructed anchor blocks adjustable with respect to said track and having their adjustable sections formed with lateral slotted extensions, means for stretching and holding the cover taut over said bows, said means including braces pivotally connected at one end to the upper stretch of one of said bows and having their free ends engageable through said slots, shoulders on said braces engageable with the ends of said slots, and tensioning means connected to the free ends of said braces and to the frame to maintain said shoulders in engaged position but permitting limited pivotal movement about said stops, whereby to maintain said cover taut irrespective of the shrinking and stretching of the cover incident to weather conditions.

8. A collapsible vehicle cover supporting structure including parallel members, a supporting frame for said members, a series of bows bridging the parallel members, coacting means between the free ends of bows and the parallel members for permitting movement of the bows lengthwise of said members, a cover supported by and connected to said bows, means for stretching and holding the cover taut over said bows, said means including a pair of tension blocks suspended from and adjustable along said parallel members, each block being composed of complemental sections relatively adjustable to engage a parallel member and one of said sections being formed with a slotted extension, braces pivotally connected at one end to the upper stretch of one of said bows and having their free ends extending through the slotted extensions of said tensioning blocks, shoulders on said braces engageable with the ends of said slots, a pair of retractile springs, said springs being connected at one end to the frame and at their opposite ends to the free end of said braces whereby to maintain said cover taut irrespective of the shrinking and stretching of the cover incidental to weather conditions.

SAMUEL C. FORRESTER.